US012378910B1

(12) United States Patent
McDonald et al.

(10) Patent No.: US 12,378,910 B1
(45) Date of Patent: Aug. 5, 2025

(54) SYSTEMS AND METHODS FOR EXTRA-STROKE ENGINE CYCLE OPERATION

(71) Applicant: Caterpillar Inc., Peoria, IL (US)

(72) Inventors: John R. McDonald, Peoria, IL (US); Derek A. Tanis, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/654,850

(22) Filed: May 3, 2024

(51) Int. Cl.
*F02D 13/02* (2006.01)
*F02B 75/02* (2006.01)
*F02D 41/40* (2006.01)
*F02D 41/38* (2006.01)

(52) U.S. Cl.
CPC ........ *F02B 75/021* (2013.01); *F02D 13/0242* (2013.01); *F02D 41/40* (2013.01); *F02B 2075/027* (2013.01); *F02D 2041/389* (2013.01); *F02D 2400/02* (2013.01)

(58) Field of Classification Search
CPC ...... F02D 13/02; F02D 13/0242; F02D 41/40; F02D 2041/389; F02D 2400/02; F02B 75/021; F02B 2075/027
USPC ................ 123/294–305, 90.11, 90.15, 90.64
See application file for complete search history.

(56) References Cited

U.S. PATENT DOCUMENTS 1,794,799 A 3/1931 Alfred
6,311,651 B1 11/2001 Singh
7,726,268 B2 6/2010 Kelem et al.
8,011,331 B2 9/2011 Albertson et al.
8,978,601 B2 3/2015 Williams et al.
8,978,602 B2 3/2015 Williams et al.
8,978,603 B2 3/2015 Williams et al.
9,057,324 B2 6/2015 Williams et al.
9,133,764 B2 9/2015 Fiveland et al.
11,519,328 B2 * 12/2022 Lassesson ............. F02B 75/021
2002/0083904 A1 * 7/2002 Otterspeer .............. F02B 75/22 123/21
2003/0019455 A1 * 1/2003 Onozawa ................ F01L 13/08 123/182.1

(Continued)

FOREIGN PATENT DOCUMENTS

CN 106930846 B 3/2021
EP 0126812 A1 12/1984

*Primary Examiner* — Hai H Huynh
*Assistant Examiner* — Johnny H Hoang
(74) *Attorney, Agent, or Firm* — Bookoff McAndrews, PLLC

(57) ABSTRACT

In one instance, disclosed herein is a controller configured for operating an engine in an extra-stroke mode, the controller comprising: a processor; and a memory storing instructions that, when executed by the processor, cause the electronic control module to generate commands for operations including: transitioning operation of the engine from a four-stroke mode to the extra-stroke mode or from the extra-stroke mode to the four-stroke mode, wherein the four-stroke mode includes an intake stroke, a compression stroke, a power stroke, and an exhaust stroke, and wherein the extra-stroke mode includes at least six strokes of a piston disposed within a combustion chamber of an engine cylinder of the engine, during which an exhaust valve of the engine cylinder is opened only once, during or immediately preceding a final upward stroke of the at least six strokes.

20 Claims, 4 Drawing Sheets

(56) References Cited

U.S. PATENT DOCUMENTS

| | | | | | |
|---|---|---|---|---|---|
| 2007/0022977 | A1* | 2/2007 | Crower | F02M 25/0222 | 123/25 C |
| 2009/0145382 | A1* | 6/2009 | Kawai | F02D 13/0226 | 123/90.16 |

* cited by examiner

SYSTEMS AND METHODS FOR EXTRA-STROKE ENGINE CYCLE OPERATION

TECHNICAL FIELD

The present disclosure relates generally to internal combustion engines, and more particularly, to methods and systems for operating an engine in according to an extra-stroke engine cycle.

BACKGROUND

Internal combustion engines typically include engine cylinders operated according to a single mode of operation, e.g., a four-stroke engine cycle. For example, a four-stroke engine cycle includes 1) an intake stroke, 2) a compression stroke, 3) a power stroke, and 4) an exhaust stroke. The cylinders of the internal combustion engine are operated according to the single mode of operation, e.g., the four-stroke engine cycle, at every level of torque output of the internal combustion engine. However, the single mode of operation, e.g., the four-stroke engine cycle, may not be the most efficient mode of operation for the internal combustion engine at every level of torque output of the internal combustion engine and/or at every condition of the engine. For example, at lower levels of torque output, the single mode of operation, e.g., the four-stroke engine cycle, may produce exhaust at a sub-optimal temperature, or may burn fuel at an unnecessarily high rate.

A method for operating an engine according to a six-stroke engine cycle that includes, for example, an intake stroke, a first compression stroke, a first power stroke, a second compression stroke, a second power stroke, and an exhaust stroke is described in European Patent Application Publication No. 0126812 A1 (the '812 publication) by Pal. By operating an engine according to a six-stroke engine cycle as described in the '812 publication, an engine may achieve greater fuel efficiency. However, the '812 publication does not disclose a method or system for operating an engine according to multiple modes of operation including engine cycles with different numbers of strokes, nor an extra-stroke engine cycle including a decompression stroke in which no valve is opened and no fuel is ignited.

The methods and systems of the present disclosure may solve one or more of the problems set forth above and/or other problems in the art. The scope of the protection provided by the present disclosure, however, is defined by the attached claims, and not by the ability to solve any specific problem.

SUMMARY

In one aspect, a method includes: operating an engine in an extra-stroke mode including: an intake stroke, in which an intake valve of an engine cylinder included in the engine is opened to allow a mass of air to enter a combustion chamber of the engine cylinder; a first compression stroke, immediately subsequent to the intake stroke, in which the mass of air within the combustion chamber is compressed; a decompression stroke, immediately subsequent to the first compression stroke, in which the mass of air within the combustion chamber is decompressed; a second compression stroke, in which the mass of air within the combustion chamber is recompressed; a power stroke, in which an air-fuel mixture including the mass of air and a mass of fuel within the combustion chamber is ignited; and an exhaust stroke, immediately subsequent to the power stroke, in which an exhaust valve of the engine cylinder is opened to allow exhaust to exit the engine cylinder.

In another aspect, a controller configured for operating an engine in an extra-stroke mode includes: a processor; and a memory storing instructions that, when executed by the processor, cause the electronic control module to generate commands for operations including: transitioning operation of the engine from a four-stroke mode to the extra-stroke mode or from the extra-stroke mode to the four-stroke mode, wherein the four-stroke mode includes an intake stroke, a compression stroke, a power stroke, and an exhaust stroke, and wherein the extra-stroke mode includes at least six strokes of a piston disposed within a combustion chamber of an engine cylinder of the engine, during which an exhaust valve of the engine cylinder is opened only once, during or immediately preceding a final upward stroke of the at least six strokes.

In another aspect, an engine system includes: an engine cylinder; a piston disposed within a combustion chamber of the engine cylinder; a fuel injector configured to inject fuel for combustion in the engine cylinder; and a controller operative to generate commands that cause the engine system to: during a first downward stroke of the piston, open an intake valve of the engine cylinder to allow a mass of air to enter the combustion chamber; during a first upward stroke of the piston immediately subsequent to the first downward stroke, compress the mass of air within the combustion chamber; during a second downward stroke of the piston immediately subsequent to the first upward stroke, decompress the mass of air within the combustion chamber without injecting fuel into the combustion chamber; during a second upward stroke of the piston immediately subsequent to the second downward stroke, recompress the mass of air within the combustion chamber without opening an exhaust valve of the engine cylinder; during, or immediately preceding, a subsequent downward stroke of the piston, inject a mass of fuel into the combustion chamber to form an air-fuel mixture within the combustion chamber and ignite the air-fuel mixture within the combustion chamber; and during a subsequent upward stroke of the piston immediately subsequent to the subsequent downward stroke of the piston, open the exhaust valve of the engine cylinder to allow exhaust to exit the engine cylinder.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms “comprises,” “comprising,” “having,” including,” or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, “about,” “substantially,” “generally,” and “approximately” are used to indicate a possible variation of ±10% in the stated value. In this disclosure, the term “based on,” or any other variation thereof, is intended to cover, for example, “partially based on”, “at least partially based on”, and “based entirely on.”

Figure 1:
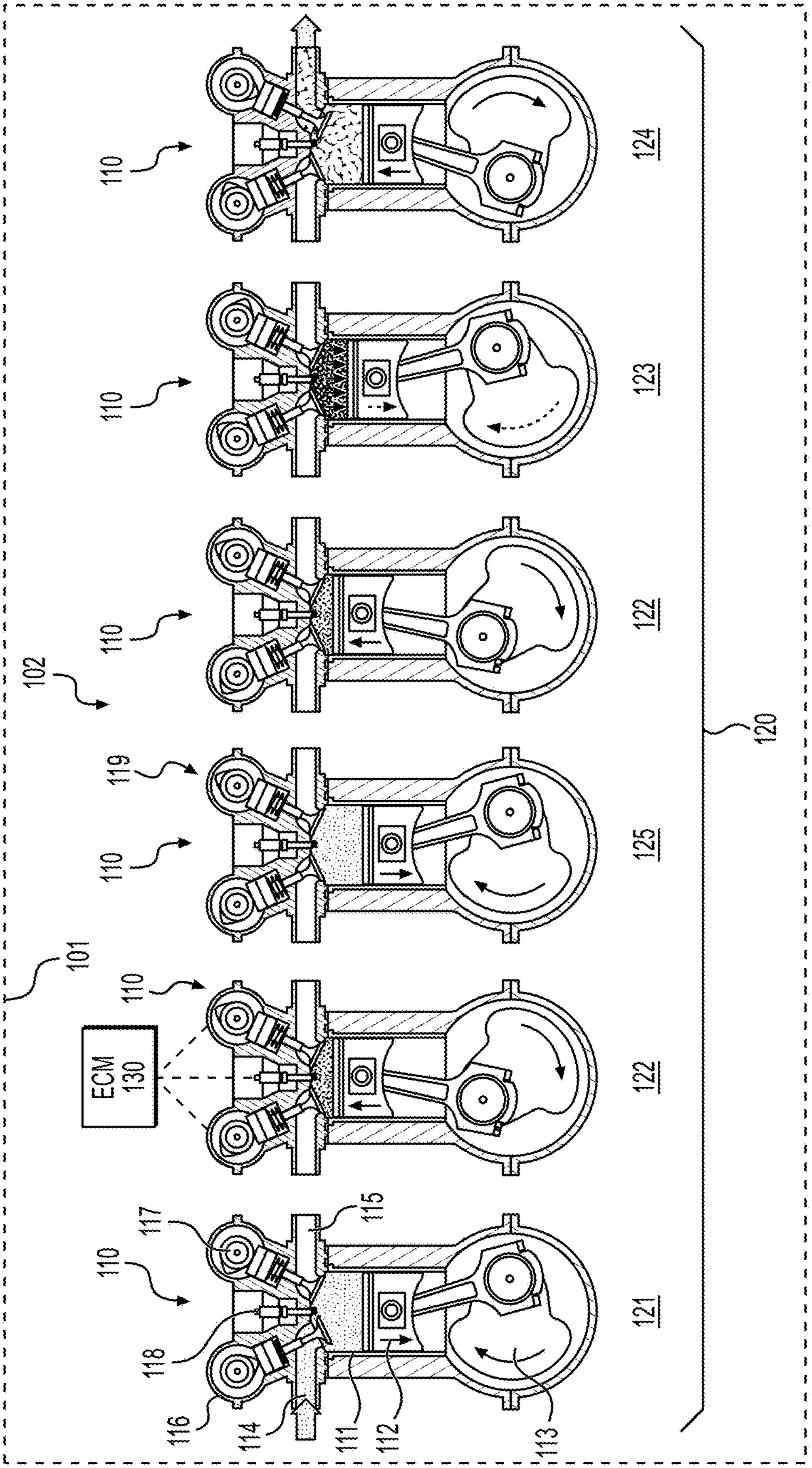
FIG. 1 depicts a schematic diagram of an exemplary extra-stroke engine cycle.

FIG. 1 depicts a schematic diagram of an engine cylinder operated according to an exemplary extra-stroke engine cycle. An engine system may 101 include an engine 102 and one or more controllers, e.g., electronic control module (ECM) 130. An engine 102, e.g., an internal combustion engine, may include a plurality of engine cylinders 110. For example, an engine 102 may be a four-cylinder engine, a six-cylinder engine, an eight-cylinder engine, etc. An engine cylinder 110 may include a combustion chamber 111 and a piston 112 disposed within the combustion chamber 111 and operative to drive a crankshaft 113. The engine cylinder 110 may additionally include an intake passage 114 operative to allow air and, if desired, fuel, to enter the combustion chamber 111. An exhaust passage 115 may be operative to allow exhaust to exit the combustion chamber 111. The engine cylinder 110 may additionally include an intake valve 116 operative to open or close the intake passage 114 and an exhaust valve 117 operative to open or close the exhaust passage 115.

The engine cylinder 110 may include a fuel injector 118 operative to inject fuel (e.g., diesel fuel) into the combustion chamber 111 and/or a spark plug (not shown) operative to ignite fuel (e.g., natural gas) within the combustion chamber 111. One or more components of the engine 102 or the engine cylinder 110, such as the intake valve 116, the exhaust valve 117, the fuel injector 118, or the spark plug, may be operatively connected to and controlled by the one or more controllers, e.g., ECM 130.

During or in response to some conditions, the one or more controllers, e.g., ECM 130, may control the engine to operate according to a four-stroke engine cycle. As described in further detail below, the four-stroke engine cycle may include, for example: 1) an intake stroke 121; 2) a compression stroke 122; 3) a power stroke 123; and 4) an exhaust stroke 124. During the intake stroke 121, the intake valve 116 is opened (e.g., the intake valve 116 positioned such that air and/or fuel is allowed to enter the combustion chamber 111 via the intake passage 114), the exhaust valve 117 is closed (e.g., the exhaust valve 117 is positioned such that exhaust is not allowed to exit the combustion chamber 111 via the exhaust passage 115), and the piston 112 moves downward, thereby drawing air into the combustion chamber 111. During the compression stroke 122, the intake valve 116 is closed (e.g., the intake valve 116 is positioned such that air and/or fuel is not allowed to enter the combustion chamber 111 via the intake passage 114), the exhaust valve 117 remains closed, and the piston 112 moves upward, thereby compressing air within the combustion chamber 111. During the power stroke 123, both the intake valve 116 and the exhaust valve 117 remain closed and an air-fuel mixture within the combustion chamber 111 is ignited, thereby driving the piston 112 downward. During the exhaust stroke 124, the intake valve 116 remains closed, the exhaust valve 117 is opened (e.g., the exhaust valve 117 is positioned such that exhaust is allowed to exit the combustion chamber 11 via the exhaust passage 115), and the piston 112 again moves upward, thereby expelling exhaust from the combustion chamber 111.

During or in response to some conditions, the one or more controllers, e.g., ECM 130, may control the engine 102 to operate according to an extra-stroke cycle 120. As described in further detail below, the extra-stroke engine cycle 120 may include, for example: 1) an intake stroke 121; 2) a first compression stroke 122; 3) a decompression stroke 125, for which both the intake valve 116 and the exhaust valve 117 remain closed and the piston 112 moves downward, thereby decompressing air within the combustion chamber 111; 4) a second compression stroke 122; 5) a power stroke 123; and 6) an exhaust stroke 124. However, an extra-stroke engine cycle 120 may include any number of compression strokes 122 and any number of decompression strokes 125 to enable eight-stroke operation, ten-stroke operation, twelve-stroke operation, etc.

Figure 2:
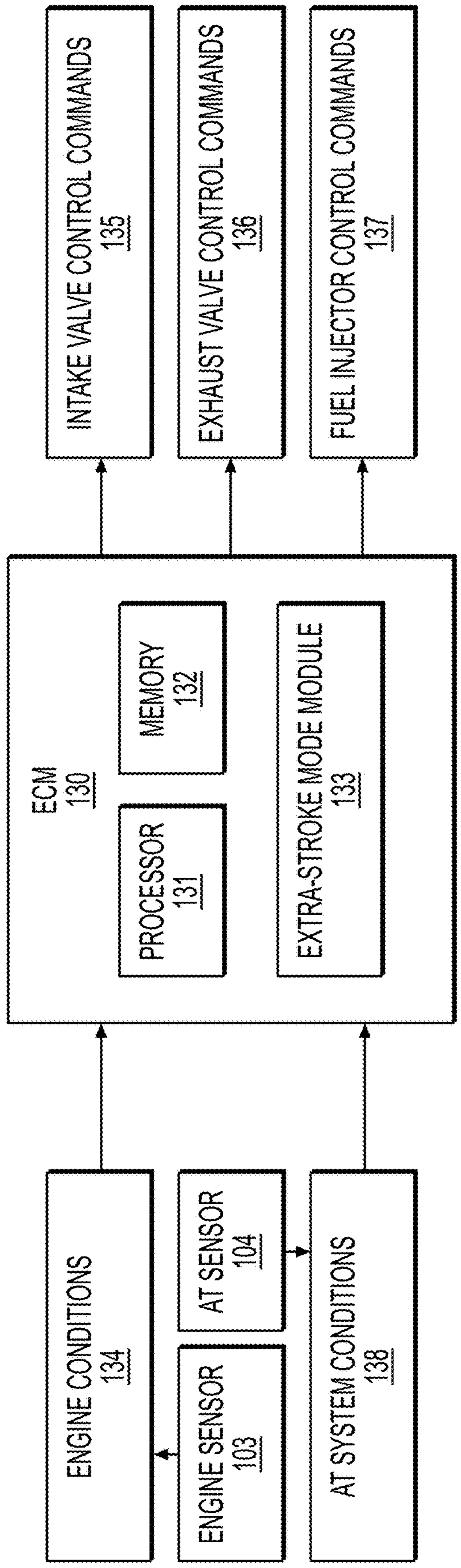
FIG. 2 depicts a block diagram of an exemplary electronic control module for operating an engine according to an extra-stroke engine cycle.

FIG. 2 depicts a block diagram of an exemplary electronic control module (ECM) 130. ECM 130 may include one or more hardware or software components, such as a processor 131, a memory 132, an extra-stroke mode module 133, or any other means for accomplishing a task consistent with the present disclosure. ECM 130 may be operative to generate and output commands for controlling one or more components of an engine cylinder 110, such as an intake valve control command 135 for actuating an intake valve 116 to open or close an intake passage 114 of the engine cylinder 110 or an exhaust valve control command 136 for actuating an exhaust valve 117 to open or close an exhaust passage 115 of the engine cylinder 110. For example, in response to an intake valve control command 135 or an exhaust valve control command 136, an electrohydraulic or electromechanical actuator 119 operatively coupled to the intake valve 116 or the exhaust valve 117 may cause the intake valve 116 or the exhaust valve 117 to be selectively activated or deactivated, as described in further detail below. ECM 130 may be operative to generate and output commands for controlling a fuel injector 118 of the engine cylinder 110, such as a fuel injector control command 137. ECM 130 may be operative (e.g., configured, with programming) to generate and output commands for controlling one or more components of an engine cylinder 110 based on or otherwise in response to one or more engine conditions 134. Engine conditions 134 may correspond to one or more signals indicative of engine parameters such as an engine speed generated with or sensed by an engine sensor 103 (e.g., an engine speed sensor), an engine load sensed by an engine sensor 103, a requested engine output reflected in an engine request generated by an operator through an interface of a machine that employs the engine cylinder 110 or calculated with ECM 130, or any other input with which ECM 130 may determine factors associated with the operation of engine cylinder 110. Additionally or alternatively, ECM 130 may be operative to generate and output commands for controlling one or more components of an engine cylinder 110 based on or otherwise in response to one or more aftertreatment (AT) system conditions 138, such as a temperature of an aftertreatment system operatively coupled to an engine 102 that includes the engine cylinder 110, as described in further detail below. A temperature of an aftertreatment system operatively coupled to an engine 102 may be generated or sensed by an aftertreatment (AT) sensor 104 (e.g., a temperature sensor).

As described in further detail below, memory 132 may include instructions executable by processor 131 to provide an extra-stroke mode module 133. Extra-stroke mode module 133 may be operative to cause ECM 130 to generate and output commands for operating engine cylinder 110 according to an extra-stroke engine cycle. Extra-stroke mode module 133 may be operative to cause ECM 130 to transition the operation of an engine cylinder 110 or an engine 102 employing the engine cylinder 110 from a first mode of operation, e.g., a four-stroke mode, in which the engine cylinder 110 is operated according to a four-stroke engine cycle, to an extra-stroke mode, in which the engine cylinder 110 is operated according to an extra-stroke engine cycle 120, or from the extra-stroke mode to the first mode, in response to one or more engine conditions 134 or AT system conditions 138, such as an engine speed or an engine load of the engine 102 or a temperature of an aftertreatment system operatively coupled to the engine 102. Additionally or alternatively, extra-stroke mode module 133 may be operative to cause ECM 130 to transition the operation of an engine cylinder 110 or an engine 102 employing the engine cylinder 110 from a first extra-stroke mode, e.g., an extra-stroke mode with an extra-stroke engine cycle 120 that includes six strokes, to a second extra-stroke mode, e.g., an extra-stroke mode with an extra-stroke engine cycle 120 that includes eight strokes, ten strokes, or more.

INDUSTRIAL APPLICABILITY

The methods and systems disclosed herein may find application in any machine that employs an engine 102 (e.g., an internal combustion engine). In particular, the methods and system disclosed herein may be used in any internal combustion engine in which it is desirable to adapt the operation of the internal combustion engine in response to different engine conditions 134. In general, the operation of an engine 102 according to an extra-stroke engine cycle 120 may improve fuel efficiency and increase exhaust temperatures, which may improve operation or efficiency of an aftertreatment system operatively coupled to the engine 102.

As mentioned above, ECM 130 may generate and output commands for operating an engine cylinder 110, or an engine 102 that employs the engine cylinder 110, according to a four-stroke engine cycle. As mentioned above, a four-stroke engine cycle may include 1) an intake stroke 121, 2) a compression stroke 122, 3) a power stroke 123, and 4) an exhaust stroke 124. For the intake stroke 121, the piston 112 may begin at the top (e.g., the top dead center or TDC) of the combustion chamber 111 and move downward, as depicted in FIG. 1 to the bottom (e.g., bottom dead center or BDC) of the combustion chamber 111. During the intake stroke 121, the exhaust valve 117 is closed and the intake valve 116 is opened, such that air is allowed to enter the combustion chamber 111 via the intake passage 114. The air may be drawn or sucked into the combustion chamber 111 by a partial vacuum or negative pressure resulting from the downward movement of the piston 112 within the combustion chamber 111. The intake stroke 121 may be considered a downward stroke of the piston 112; however, it will be understood that directional terms such as "upward" and "downward" may be relative to the top and/or bottom of the combustion chamber 111 and may not describe absolute directions.

As illustrated in FIG. 1, for the compression stroke 122, the piston 112 may begin at the bottom of the combustion chamber 111 and move upward to the top of the combustion chamber 111. During the compression stroke 122, both the intake valve 116 and the exhaust valve 117 are closed, such that the upward movement of the piston 112 within the combustion chamber 111 compresses the air within the combustion chamber 111. The compression stroke 122 may be considered an upward stroke of the piston 112. After the intake stroke 121 and the compression stroke 122, the piston 112 has completed one full downward and upward cycle within the combustion chamber 111, and the crankshaft 113 has completed one full 360 degree revolution.

According to the four-stroke engine cycle, a power stroke 123 may be performed following the compression stroke 122. For the power stroke 123, the piston 112 may again begin at the top of the combustion chamber 111 and move downward to the bottom of the combustion chamber 111. When the piston 112 is at or near the top of the combustion chamber 111, a compressed mixture of air and fuel, also referred to as an air-fuel mixture, is ignited, such as by a spark plug or by compression ignition, and the combustion of the air-fuel mixture forcibly drives the piston 112 toward the bottom of the combustion chamber 111, producing mechanical work through rotation of the crankshaft 113. During the power stroke 123, like the compression stroke 122, both intake valve 116 and the exhaust valve 117 are closed. The power stroke 123 may be considered a downward stroke of the piston 112. In some instances, an air-fuel mixture is allowed to enter the combustion chamber 111 via the intake passage 114. In some instances, only air is allowed to enter the combustion chamber 111 via the intake passage 114, and a mass of fuel may be injected into the combustion chamber 111 at the beginning of, or immediately preceding, the power stroke 123, such as by a fuel injector operatively coupled to the engine cylinder 110.

For the exhaust stroke 124, the piston 112 may again begin at the bottom of the combustion chamber 111 and move upward to the top of the combustion chamber 111. The exhaust valve 117 is opened, such that exhaust produced by the combustion of the air-fuel mixture is allowed to exit the combustion chamber 111. The exhaust may be expelled from the combustion chamber 111 by the upward movement of the piston 112. The exhaust stroke 124 may be considered an upward stroke of the piston 112. After the power stroke 123 and the exhaust stroke 124, the piston 112 has completed a second full up and down cycle within the combustion chamber 111, the crankshaft 113 has completed a second full 360 degree revolution, and the four-stroke engine cycle is complete.

As mentioned above, ECM 130 may generate and output commands for operating an engine cylinder 110, or an engine that employs the engine cylinder 110, according to an extra-stroke engine cycle 120. As depicted in FIG. 1, like the four-stroke engine cycle described above, an extra-stroke engine cycle 120 may include an intake stroke 121, a compression stroke 122, a power stroke 123, and an exhaust stroke 124, and additionally at least one decompression stroke 125 and at least one additional compression stroke 122. Thus, an extra-stroke engine cycle 120 may include at least six strokes of a piston 112 disposed within a combustion chamber 111 of an engine cylinder 110, but may include more than six strokes, e.g., eight strokes, ten strokes, or twelve strokes. For example, in addition to an intake stroke 121, a first compression stroke 122, a power stroke 123, and an exhaust stroke 124, an extra-stroke engine cycle 120 may include one decompression stroke 125 and one additional compression stroke 122, two decompression strokes 125 and two additional compression strokes 122, or three decompression strokes 125 and three additional compression strokes 122. However, an extra-stroke engine cycle 120 may include any appropriate number of strokes of a piston 112 disposed within a combustion chamber 111 of an engine cylinder 110.

As depicted in FIG. 1, an extra-stroke engine cycle 120 may begin with an intake stroke 121, as described above, in which a piston 112 disposed within a combustion chamber 111 of an engine cylinder 110 moves downward, an exhaust valve 117 of the engine cylinder 110 is closed, and an intake valve 116 of the engine cylinder 110 is opened to allow air to enter the combustion chamber 111. After the intake stroke 121, the extra-stroke engine cycle 120 may continue with a first compression stroke 122, in which both the intake valve 116 and the exhaust valve 117 are closed and the piston 112 moves upward, such that the air and/or fuel within the combustion chamber 111 is compressed. Unlike in the four-stroke engine cycle described above, after the first compression stroke 122, the extra-stroke engine cycle 120 may continue with a decompression stroke 125, instead of a power stroke 123. For the decompression stroke 125, the piston 112 may begin at the top of the combustion chamber 111 and move downward to the bottom of the combustion chamber 111. Thus, like the intake stroke 121 and the power stroke 123, the decompression stroke 125 may be considered a downward stroke of the piston 112. However, unlike the intake stroke 121, for the decompression stroke 125, both the intake valve 116 and the exhaust valve 117 of the engine cylinder 110 are closed; unlike the power stroke 123, for the decompression stroke 125, fuel may not yet be injected into, and/or is not ignited within, the combustion chamber 111. Thus, the decompression stroke 125 may be considered a downward stroke of the piston 112 for which opening the intake valve 116 of the engine cylinder 110 to allow air and/or fuel to enter the combustion chamber 111 of the engine cylinder 110, injecting fuel into the combustion chamber 111, and/or igniting fuel within the combustion chamber 111 is forgone, such that air and/or fuel within the combustion chamber 111 is decompressed.

As depicted in FIG. 1, after the decompression stroke 125, the extra-stroke engine cycle 120 may continue with an additional compression stroke 122. After the additional compression stroke 122, the extra-stroke engine cycle 120 may continue with a power stroke 123 and an exhaust stroke 124, thereby completing the extra-stroke engine cycle 120. Alternatively, after the additional compression stroke 122, the extra-stroke engine cycle 120 may continue with another decompression and compression stroke pair, and may continue with any number of additional decompression and compression stroke pairs, until finishing with a power stroke 123 and an exhaust stroke 124. For example, an extra-stroke engine cycle 120 may include 1) an intake stroke 121, 2) a first compression stroke 122, 3) a decompression stroke 125, 4) a second compression stroke 122, 5) a power stroke 123, and 6) an exhaust stroke 124. Or for example, an extra-stroke engine cycle 120 may include 1) an intake stroke 121, 2) a first compression stroke 122, 3) a first decompression stroke 125, 4) a second compression stroke 122, 5) a second decompression stroke, 6) a third compression stroke 122, 7) a power stroke 123, and 8) an exhaust stroke 124. In some instances, for an extra-stroke engine cycle 120, a mass of fuel is injected into the combustion chamber 111 of an engine cylinder 110 only during or immediately preceding the power stroke 123. In other instances (e.g., gaseous-fueled engines), for an extra-stroke engine cycle 120, a mass of fuel is allowed to enter the combustion chamber 111 of an engine cylinder 110 along with a mass of air during the intake stroke 121.

Figure 3:
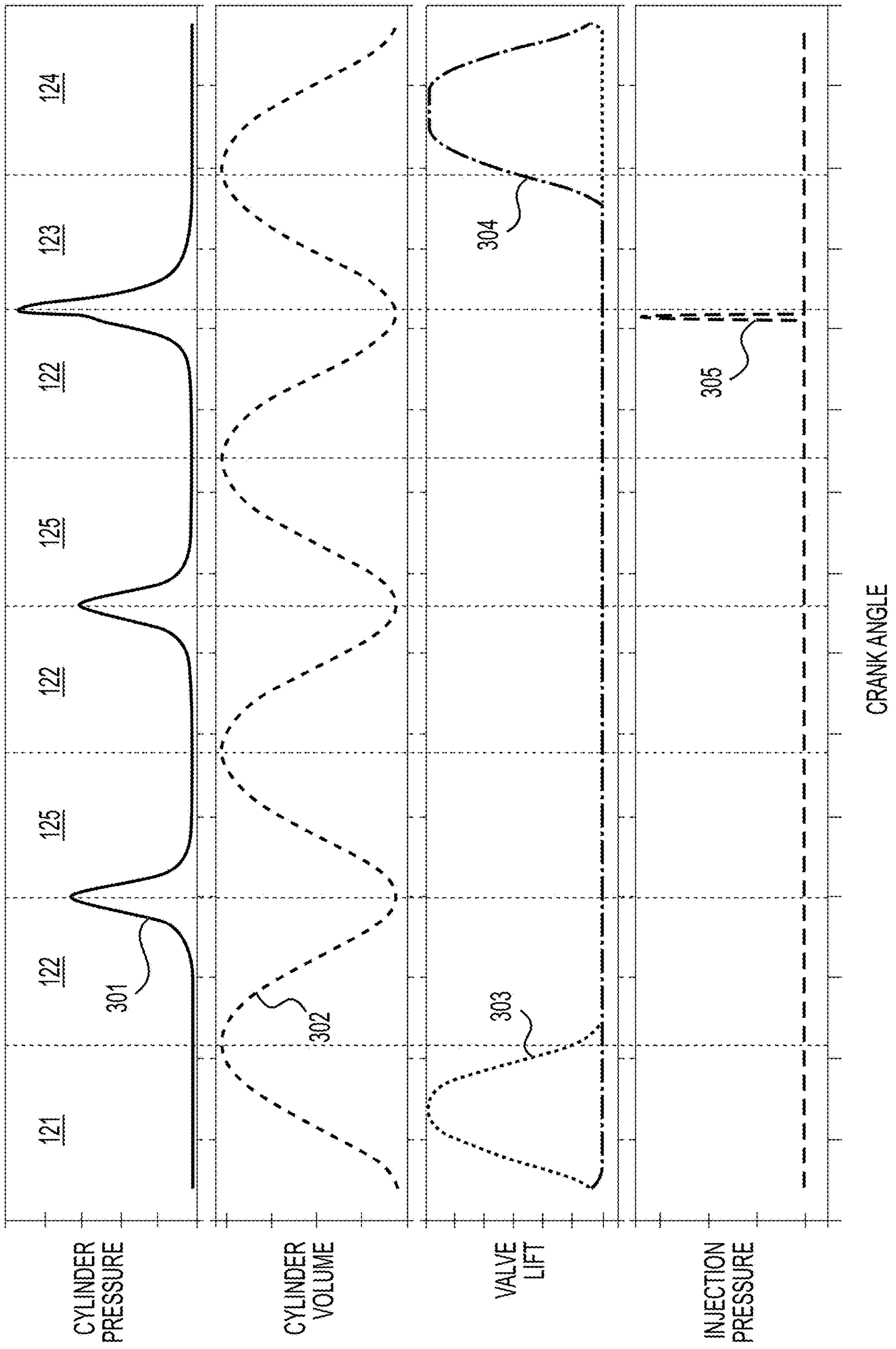
FIG. 3 depicts charts representing an exemplary operation of an engine according to an extra-stroke engine cycle.

FIG. 3 depicts charts representing an exemplary operation of an engine cylinder 110, or an engine that employs the engine cylinder 110, according to an extra-stroke engine cycle 120. In the example depicted in FIG. 3, an engine cylinder 110 is operated according to an extra-stroke engine cycle 120 that includes eight strokes of a piston 112 disposed within a combustion chamber 111 of the engine cylinder 110. For example, FIG. 3 depicts the pressure 301 within the engine cylinder 110 (also referred to as cylinder pressure 301), the volume 302 within the engine cylinder 110 (also referred to as cylinder volume 302), the displacement 303 of the intake valve 116 (also referred to as intake valve lift 303), the displacement of the exhaust valve 117 (also referred to as exhaust valve lift 304), and the injector pressure 305 of a fuel injector operatively coupled to the engine cylinder 110 throughout the eight strokes of the extra-stroke engine cycle 120.

In this example, as depicted in FIG. 3, during the first stroke of the extra-stroke engine cycle 120, an intake stroke 121, the cylinder volume 302 begins at a first local minimum volume and increases to a first local maximum volume as a piston 112 disposed within the combustion chamber 111 moves from the top of the combustion chamber 111 to the bottom of the combustion chamber 111. During this first stroke, an intake valve 116 of the engine cylinder 110 (FIG. 1) is opened and closed, represented by the increase of the intake valve lift 303 from a first local minimum intake valve lift to a maximum intake valve lift followed by the decrease of the intake lift 303 from the maximum intake lift down to a second local minimum intake lift, and the cylinder pressure 301 remains at a relatively constant first local minimum pressure. In this example, while the intake valve 116 is open during the intake stroke 121, air is allowed to enter the combustion chamber 111 of the engine cylinder 110 through an intake passage 114.

During the second stroke of the extra-stroke engine cycle 120, a first compression stroke 122, the cylinder volume 302 begins at the first local maximum volume and decreases to a second local minimum volume as the piston 112 disposed within the combustion chamber 111 moves from the bottom of the combustion chamber 111 to the top of the combustion chamber 111 with both the intake valve 116 and the exhaust valve 117 closed, as indicated by the intake valve lift 303 and the exhaust valve lift 304 remaining at relatively constant minimums. As the piston 112 moves from the bottom of the combustion chamber 111 to the top of the combustion chamber 111 with both the intake valve 116 and the exhaust valve 117 closed, the air within the combustion chamber 111 is compressed, and the cylinder pressure 301 increases from the first local minimum pressure to a first local maximum pressure accordingly.

As depicted in FIG. 3, during the third stroke of the extra-stroke engine cycle 120, a first decompression stroke 125, the cylinder volume 302 begins at the second local minimum volume and increases to a second local maximum volume as the piston 112 disposed within the combustion chamber 111 again moves from the top of the combustion chamber 111 to the bottom of the combustion chamber 111, this time with both the intake valve 116 and the exhaust valve 117 closed, as indicated by the intake valve lift 303 and the exhaust valve lift 304 remaining at their relatively constant minimums. As the piston 112 moves from the top of the combustion chamber 111 to the bottom of the combustion chamber 111 with both the intake valve 116 and the exhaust valve 117 closed, the compressed air within the combustion chamber 111 is decompressed, and the cylinder pressure 301 decreases from the first local maximum pressure to a second local minimum pressure accordingly.

During the fourth stroke of the extra-stroke engine cycle 120, a second compression stroke 122, the cylinder volume 302 begins at the second local maximum volume and decreases to a third local minimum volume as the piston 112 disposed within the combustion chamber 111 again moves from the bottom of the combustion chamber 111 to the top of the combustion chamber 111 with both the intake valve 116 and the exhaust valve 117 closed. Similar to the second stroke, the first compression stroke 122, as the piston 112 moves from the bottom of the combustion chamber 111 to the top of the combustion chamber 111 with both the intake valve 116 and the exhaust valve 117 closed, the decompressed air within the combustion chamber 111 is recompressed, and the cylinder pressure 301 increases from the second local minimum pressure to a second local maximum pressure accordingly.

The fifth and sixth strokes of the extra-stroke engine cycle 120, a second decompression stroke 125 and a third compression stroke 122, respectively, repeat the third and fourth strokes of the extra-stroke engine cycle 120. At the beginning of, or immediately preceding, the seventh stroke of the extra-stroke engine cycle 120, a power stroke 123, a mass of fuel is injected into the combustion chamber 111, as indicated by the sharp increase in the injector pressure 305. Accordingly, in this example, for the extra-stroke engine cycle 120, fuel is only injected into the combustion chamber 111 during or immediately preceding the power stroke 123, as depicted in FIG. 3. Just after the mass of fuel is injected into the combustion chamber 111, the mass of fuel, or the air-fuel mixture, within the combustion chamber 111 is ignited. The increase in the cylinder pressure 301 due to the combustion of the fuel within the combustion chamber 111, in addition to the increase in the cylinder pressure 301 due to the third compression stroke 122, causes the cylinder pressure 301 to increase to a global maximum pressure and then decrease as the piston 112 disposed within the combustion chamber 111 is forcibly driven down to the bottom of the combustion chamber 111 by the combustion of the fuel within the combustion chamber 111, movement indicated by the increase in the cylinder volume 302 from a fourth local minimum volume to a fourth local maximum volume.

Finally, during the eighth stroke of the extra-stroke engine cycle 120, an exhaust stroke 124, the cylinder volume 302 decreases from the fourth local maximum volume to a fifth local minimum volume as the piston 112 disposed within the combustion chamber 111 again moves from the bottom of the combustion chamber 111 to the top of the combustion chamber 111. As depicted in FIG. 3, during this eighth and final stroke of the extra-stroke engine cycle 120, an exhaust valve 117 of the engine cylinder 110 is opened and closed, represented by the increase of the exhaust valve lift 304 from a first local minimum exhaust valve lift to a maximum exhaust valve lift followed by the decrease of the exhaust valve lift 304 from the maximum exhaust valve lift down to a second local minimum exhaust valve lift, and the cylinder pressure 301 remains at a relatively constant minimum pressure. While the exhaust valve 117 is open during the exhaust stroke 124, exhaust produced by the combustion of the air-fuel mixture within the combustion chamber 111 during the power stroke 123 is allowed to exit the combustion chamber 111 through an exhaust passage 115.

As described above, a controller (e.g., ECM 130) operatively coupled to an engine 120 may transition operation of the engine 102, or cause the engine 102 to transition operation of the engine 102, between a first mode of operation, e.g., a four-stroke mode, wherein the engine 102 operates according to a four-stroke engine cycle, as described above, and an extra-stroke mode, wherein the engine 102 operates according to an extra-stroke engine cycle 120, as described above, such as by employing an extra-stroke mode module 133. Using the extra-stroke mode module 133, ECM 130 may cause an engine 102 to transition from a four-stroke mode to an extra-stroke mode, or from an extra-stroke mode to a four-stroke mode. ECM 130 may cause an engine 102 to transition between a first mode and an extra-stroke mode through the use of one or more intake valve control commands 135 and/or one or more exhaust valve control commands 136. In some instances, when causing an engine 102 to transition between a first mode and an extra-stroke mode, the ECM 130 controls or allows the engine 102 to operate according to the first mode for a plurality of cycles (e.g., a plurality of four-stroke engine cycles) and then controls or allows the engine 102 to operate according to the extra-stroke mode for a plurality of cycles (e.g., a plurality of extra-stroke engine cycles 120), or vice versa. However, ECM 130 may cause an engine 102 to transition between a first mode and an extra-stroke mode in any other appropriate way. For example, ECM 130 may cause an engine 102 to transition between a first mode and an extra-stroke mode after one engine cycle, or after each engine cycle in a series of consecutive engine cycles (e.g., a four-stroke engine cycle immediately followed by an extra-stroke engine cycle 120, immediately followed by another four-stroke engine cycle, immediately followed by another extra-stroke engine cycle 120, etc.).

As mentioned above, a controller (e.g., ECM 130) may cause an engine 102 to transition between a first mode of operation and an extra-stroke mode in response to one or more engine conditions 134. For example, ECM 130 may be operative to cause an engine 102 to transition a) from a four-stroke mode to an extra-stroke mode in response to detecting that an engine load of the engine (e.g., a load applied to or drawn from the engine) is below a threshold engine load, or b) from an extra-stroke mode to a four-stroke mode in response to detecting that an engine load of the engine is above a threshold engine load. ECM 130 may be operative to cause an engine 102 to transition between a first mode and an extra-stroke mode in response to detecting that an engine load of the engine is below or above a threshold engine load for a threshold amount of time or for a threshold number of engine cycles.

In some instances, ECM 130 may be operative to cause an engine 102 to transition between a first mode of operation and an extra-stroke mode in response to one or more AT system conditions 138, such as a temperature of an aftertreatment system included in, operatively coupled to, or employed by the engine falling below or rising above a threshold aftertreatment system temperature. Additionally or alternatively, the temperature of the engine 102 itself (e.g., based on exhaust temperature measured with a temperature sensor) may be used as the basis for entering the extra-stroke mode, the extra-stroke mode being activated when the temperature of the engine 102 is below a predetermined threshold and/or when the engine 102 is in a cold-start condition.

In some instances, ECM 130 may be operative to cause an engine 102 to transition between a first mode of operation and an extra-stroke mode in response to input from an operator of a machine that includes the engine 102 and ECM 130. For example, ECM 130 may be operative to detect a selection, by an operator of a vehicle that includes the ECM 130, of an extra-stroke mode button from within an interface of the vehicle, and, in response to detecting the selection of the extra-stroke mode button, cause an engine 102 included in the vehicle to transition from a first mode of operation to an extra-stroke mode. However, ECM 130 may be operative to cause an engine 102 to transition between a first mode of operation and an extra-stroke mode in response to any other appropriate input, or any combination of appropriate inputs (e.g., an engine load of the engine 102 and an aftertreatment system temperature of an aftertreatment system operatively coupled to or otherwise employed by the engine 102). Or for example, ECM 130 may be operative to cause an engine 102 to transition between a first extra-stroke mode, e.g., an extra-stroke mode with an extra-stroke engine cycle 120 that includes six strokes, to a second extra-stroke mode, e.g., an extra-stroke mode with an extra-stroke engine cycle 120 that includes eight strokes, such as in response to an engine load of the engine falling below a threshold engine load.

As described above, an extra-stroke engine cycle 120 may include one or more decompression strokes 125, in which compressed air within a combustion chamber 111 may be decompressed, and one or more additional compression strokes 122, in which decompressed air within a combustion chamber 11 may be recompressed. In some instances, executing a decompression stroke 125 or an additional compression stroke 122 may include forgoing injecting and/or igniting fuel within a combustion chamber 111 of an engine cylinder 110 and/or forgoing opening an exhaust valve 117 of an engine cylinder 110. For example, when compared to a four-stroke engine cycle, the first two strokes of an extra-stroke engine cycle 120 may be the same as those of the four-stroke engine cycle, but the third and fourth strokes of the extra-stroke engine cycle 120 may differ from those of the four-stroke engine cycle in that 1) unlike during the third stroke of the four-stroke engine cycle, a power stroke 123, during the third stroke of the extra-stroke engine cycle, a decompression stroke 125, a mass of fuel is either not injected into the combustion chamber 111 of the engine cylinder 110 or not ignited, and 2) unlike during the fourth stroke of the four-stroke engine, an exhaust stroke 124, during the fourth stroke of the extra-stroke engine cycle 120, a second compression stroke 122, an exhaust valve 117 of the engine cylinder 110 is not opened. Thus, operating an engine 102 according to an extra-stroke engine cycle 120, or transitioning operation of an engine 102 from a first mode of operation to an extra-stroke mode, may include forgoing injecting and/or igniting fuel during the third stroke of the engine cycle and/or forgoing opening an exhaust valve 117 during the fourth stroke of the engine cycle. Forgoing opening an intake valve 116 and/or an exhaust valve 117 of an engine cylinder 110 may including deactivating the intake valve 116 and/or the exhaust valve 117, as described in further detail below.

Operating an engine 102 according to an extra-stroke engine cycle 120, or transitioning operation of an engine 102 from a first mode of operation to an extra-stroke mode, may include selectively activating and/or deactivating an intake valve 116 and/or an exhaust valve 117 of one or more engine cylinders 110 of the engine 102. For example, a first mode of operation for an engine 102 may be a four-stroke mode, in which the engine 102 is operated according to a four-stroke engine cycle, as described above. In two consecutive cycles of the four-stroke engine cycle, an intake valve 116 of an engine cylinder 110 included in the engine may be open during the first and fifth strokes, and an exhaust valve 117 of the engine cylinder 110 may be open during the fourth and eighth strokes. In this example, if the operation of the engine 102 is transitioned from the four-stroke mode to an extra-stroke mode, in which the engine 102 is operated according to an extra-stroke engine cycle 120 that includes eight strokes, the intake valve 116 of the engine cylinder 110 may be open during only the first stroke, and the exhaust valve 117 of the engine cylinder may be open during only the eighth stroke. Thus, in this example, to transition the operation of the engine 102 from the four-stroke mode to the extra-stroke mode with an extra-stroke engine cycle including eight strokes, a controller (e.g., ECM 130) may generate and output one or more intake valve control commands 135 and one or more exhaust valve control commands 136 that cause the intake valve 116 of the engine cylinder 110 to be selectively deactivated every fifth stroke and the exhaust valve 117 of the engine cylinder 110 to be selectively deactivated every fourth stroke. Otherwise, in this example, the intake valve 116 and the exhaust valve 117 of the engine cylinder 110 operate in the same way that they operate in the four-stroke mode.

Or for example, in three consecutive cycles of the four-stroke engine cycle, the intake valve 116 of the engine cylinder 110 may be open during the first, fifth, and ninth strokes, and the exhaust valve 117 of the engine cylinder 110 may be open during the fourth, eighth, and twelfth strokes. In this example, if the operation of the engine 102 is transitioned from the four-stroke mode to an extra-stroke mode with an extra-stroke engine cycle 120 that includes six strokes, in two consecutive cycles of the extra-stroke engine cycle 120, the intake valve 116 of the engine cylinder 110 may be open during only the first and seventh strokes, and the exhaust valve 117 of the engine cylinder 110 may be open during only the sixth and twelfth strokes. Thus, in this example, to transition the operation of the engine 102 from the four-stroke mode to the extra-stroke mode with an extra-stroke engine cycle 120 that includes six strokes, a controller (e.g., ECM 130) may generate and output one or more intake valve control commands 135 and one or more exhaust valve control commands 136 that cause the intake valve 116 of the engine cylinder 110 to be selectively deactivated every fifth and ninth stroke and selectively activated every seventh stroke, and cause the exhaust valve 117 of the engine cylinder 110 to be selectively deactivated every fourth and eighth stroke and selectively activated every sixth stroke. Otherwise, in this example, the intake valve 116 and the exhaust valve 117 of the engine cylinder 110 operate in the same way that they operate in the four-stroke mode.

The intake valve 116 and exhaust valve 117 of an engine cylinder 110 may be selectively activated or selectively deactivated in various ways, such as through the use of cylinder deactivation (CDA) technologies that employ variable valves. For example, as mentioned above, an engine cylinder 110 may include one or more actuators 119, e.g., hydraulic, electrohydraulic, or electromechanical actuators, operatively coupled to an intake valve 116 and/or an exhaust valve 117 of the engine cylinder 110 that my selectively activate and/or deactivate the intake valve 116 and/or the exhaust valve 117. In some instances, an actuator 119 may have multiple steady states that the actuator 119 can be actuated between, such as a first state in which the actuator 119 causes a valve, e.g., an intake valve 116 and/or an exhaust 117, operatively coupled to the actuator 119 to be activated, and a second state in which the actuator 119 causes the valve to be deactivated. In some instances, an actuator 119 may have an actuated state and an unactuated or default state. In the unactuated or default state, the actuator 119 cause a valve operatively coupled to the actuator 119 to be normally activated or normally deactivated, such that actuating the actuator 119 into the actuated stated causes the valve to be deactivated or activated, respectively.

Figure 4:
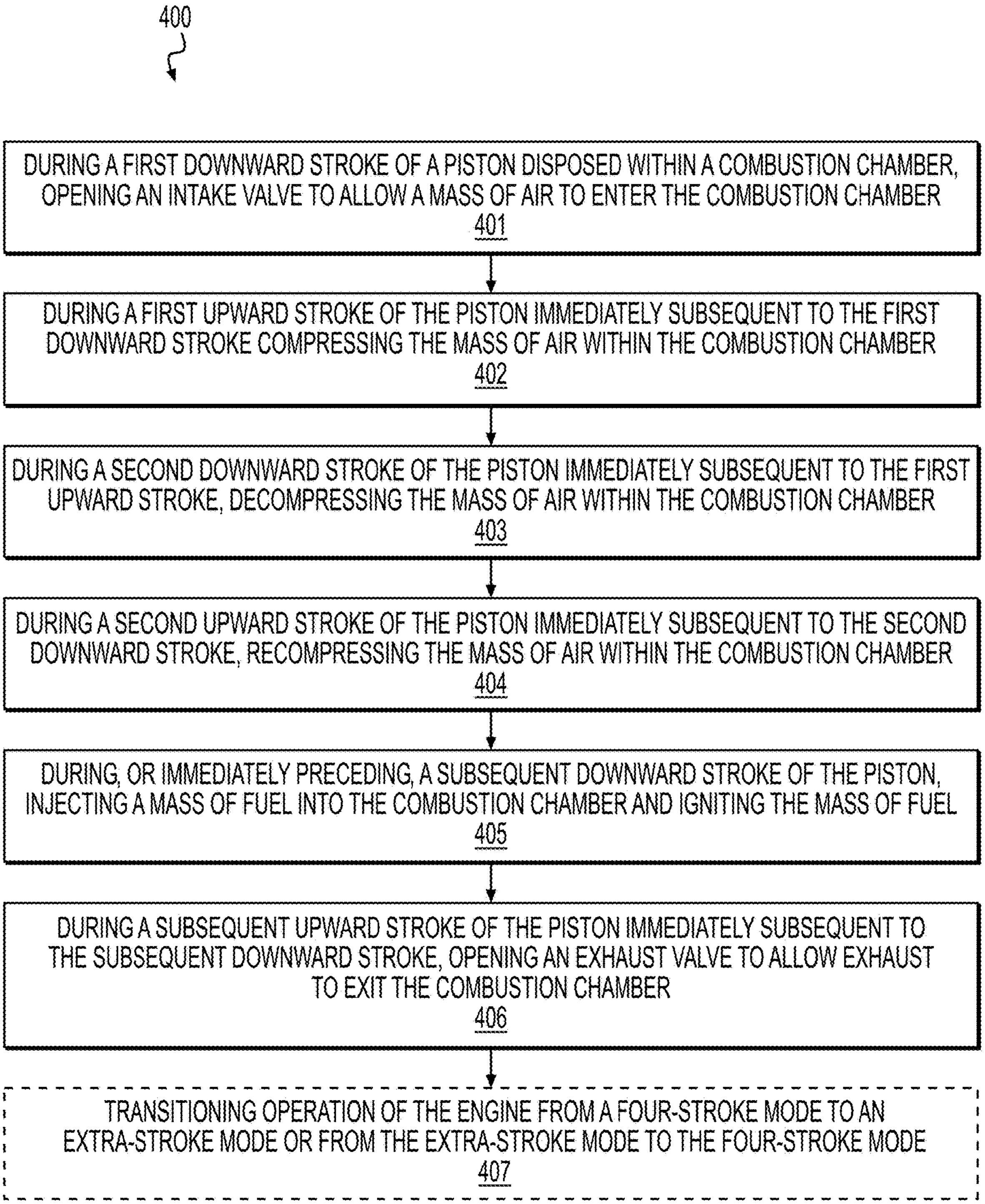
FIG. 4 depicts a flowchart of a method for operating an engine according to an extra-stroke engine cycle.

FIG. 4 depicts a flowchart of a method 400 for operating an engine 102 according to an extra-stroke engine cycle 120. As depicted in FIG. 4, method 400 may being with a step 401, in which, during a first downward stroke of a piston 112 disposed within a combustion chamber 111 of an engine cylinder 110 included in the engine, an intake valve 116 of the engine cylinder 110 is opened to allow a mass of air to enter the combustion chamber 111. The first downward stroke of the piston 112 may be an intake stroke 121, as described above. During the first downward stroke of the piston 112, an exhaust valve 117 of the engine cylinder 110 may be closed. The intake valve 116 may be opened in response to one or more intake valve control commands 135 generated and outputted by an ECM 130 operatively coupled to the engine cylinder 110.

As depicted in FIG. 4, method 400 may continue with a step 402, in which, during a first upward stroke of the piston 112, immediately subsequent to the first downward stroke of the piston 112, the mass of air within the combustion chamber 111 is compressed. The first upward stroke of the piston 112 may be a compression stroke 122, as described above. During the first upward stroke of the piston 112, both the intake valve 116 and the exhaust valve 117 of the engine cylinder 110 may be closed.

As depicted in FIG. 4, method 400 may continue with a step 403, in which, during a second downward stroke of the piston 112, immediately subsequent to the first upward stroke of the piston 112, the mass of air within the combustion chamber is decompressed. The second downward stroke of the piston 112 may be a decompression stroke 125, as described above. During the second downward stroke of the piston 112, both the intake valve 116 and the exhaust valve 117 of the engine cylinder 110 may be closed. The second downward stroke of the piston 112 may include forgoing injecting a mass of fuel into the combustion chamber 111 and/or forgoing igniting a mass of fuel within the combustion chamber 111, as described above.

As depicted in FIG. 4, method 400 may continue with a step 404, in which, during a second upward stroke of the piston 112, immediately subsequent to the second downward stroke of the piston 112, the mass of air within the combustion chamber 111 is recompressed. The second upward stroke of the piston 112 may be an additional compression stroke 122, as described above. During the second upward stroke of the piston 112, both the intake valve 116 and the exhaust valve 117 of the engine cylinder 110 may be closed. The second upward stroke of the piston 112 may include forgoing opening the exhaust valve 117 of the engine cylinder 110, as described above. Forgoing opening the exhaust valve 117 of the engine cylinder 110 may include deactivating the exhaust valve 117, as described above. Opening the exhaust valve 117 may be forgone in response to one or more exhaust valve control commands 136 generated and outputted by an ECM 130 operatively coupled to the engine cylinder 110.

As depicted in FIG. 4, method 400 may continue with a step 405, in which, during, or immediately preceding, a subsequent downward stroke of the piston 112, a mass of fuel is injected into the combustion chamber 111 of the engine cylinder 110, and the mass of fuel within the combustion chamber 111 is ignited. The subsequent downward stroke of the piston 112 may be a power stroke 123, as described above. During the subsequent downward stroke of the piston 112, both the intake valve 116 and the exhaust valve 117 of the engine cylinder 110 may be closed. The subsequent downward stroke of the piston 112 may be immediately subsequent to the second upward stroke of the piston 112, or may be subsequent to at least one downward stroke of the piston 112 subsequent to the second upward stroke of the piston 112.

As depicted in FIG. 4, method 400 may include a step 406, in which, during a subsequent upward stroke of the piston 112, immediately subsequent to the subsequent downward stroke of the piston 121, the exhaust valve 117 of the engine cylinder 110 is opened to allow exhaust to exit the combustion chamber 111 of the engine cylinder 110. The subsequent upward stroke of the piston 112 may be an exhaust stroke 124, as described above. During the subsequent upward stroke of the piston 112, the intake valve 116 of the engine cylinder 110 may be closed. The exhaust valve 117 of the engine cylinder 110 may be opened in response to one or more exhaust valve control commands 136 generated and outputted by an ECM 130 operatively coupled to the engine cylinder 110.

As depicted in FIG. 4, method 400 may include a step 407, in which operation of the engine 102 is transitioned from a first mode of operation, e.g., a four-stroke mode, to an extra-stroke mode, or from the extra-stroke mode to the first mode. The operation of the engine 102 may be transitioned between the first mode and the extra-stroke mode in response to one or more engine conditions, such as an engine speed or an engine load of the engine 102. Alternatively or additionally, the operation of the engine 102 may be transitioned between the first mode and the extra-stroke mode in response to one or more aftertreatment system conditions, such as a temperature of an aftertreatment system operatively coupled to the engine 102.

When compared to a four-stroke engine cycle (as described above), for example, an extra-stroke engine cycle 120 1) injects fuel into the combustion chamber 111 of an engine cylinder 110 less often and 2) allows exhaust to exit the combustion chamber 111 of the engine cylinder 110 less often. For example, if each stroke of the four-stroke or extra-stroke engine cycle takes the same amount of time, an extra-stroke engine cycle 120 that includes six strokes (e.g., the four strokes included in the four-stroke engine cycle, a decompression stroke 125, and an extra compression stroke 122, as described above) would be 50% longer than a four-stroke engine cycle, and would therefore inject fuel into the combustion chamber 111 and allow exhaust to exit the combustion chamber 111 approximately 33% less often; an extra-stroke engine cycle 120 that includes eight strokes (e.g., the four strokes included in the four-stroke engine cycle, two decompression strokes 125, and two extra compression strokes 122, as described above) would be twice as long as the four-stroke engine cycle, and would therefore inject fuel into the combustion chamber 111 and allow exhaust to exit the combustion chamber 111 approximately 50% less often.

By injecting fuel into the engine cylinders 110 of an engine less often, the extra-stroke engine cycle 120 may cause the engine to consume more fuel during power strokes 123, thereby improving the engine's overall fuel efficiency. By inducting air and allowing exhaust to exit the engine cylinders 110 of an engine less often, the extra-stroke engine cycle 120 may cause the airflow received by an aftertreatment system employed by the engine to be lessened, which may cause the temperature of the aftertreatment system to increase. In general, one or more components of an aftertreatment system employed by an engine may operate more efficiently as the temperature of the aftertreatment system increases. For example, an aftertreatment system employed by an engine may include one or more catalysts (e.g., an oxidation catalyst or a selective catalytic reduction system) operative to reduce the amount of harmful or otherwise undesired emissions released by the engine, and the one or more catalysts included in the engine may reduce the amount of harmful or otherwise undesired emissions released by the engine more efficiently as the temperature of the aftertreatment system increases. Thus, by allowing exhaust to exit the engine cylinders 110 of an engine less often, and thereby increasing the temperature of an aftertreatment system employed by the engine, the extra-stroke engine cycle 120 may cause the aftertreatment system to reduce undesired emissions more efficiently. By introducing one or more decompression strokes 125 and/or one or more additional compression strokes 122, the extra stroke engine cycle 120 may reduce the temperature of the air or the air-fuel mixture contained within a combustion chamber 111 of an engine cylinder 110, thereby reducing the production of unwanted emissions such as $NO_x$. By transitioning the operation of an engine 102 between a first mode of operation, e.g., a four-stroke mode, and an extra-stroke mode, in response to engine conditions 135 and/or aftertreatment system conditions 138, the engine 102 may operate more efficiently and/or advantageously under different conditions. For example, the engine 102 may use less fuel when less fuel is required, or generate more heat when more heat is desired.

It will be apparent to those skilled in the art that various modifications and variations can be made to the disclosed method and system without departing from the scope of the disclosure. Other embodiments of the method and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. A method, comprising:

operating an engine in an extra-stroke mode including:

an intake stroke, during which an intake valve of an engine cylinder included in the engine is opened to allow a mass of air to enter a combustion chamber of the engine cylinder;

a first compression stroke, immediately subsequent to the intake stroke, during which the mass of air within the combustion chamber is compressed;

a decompression stroke, immediately subsequent to the first compression stroke, during which the mass of air within the combustion chamber is decompressed and during which the mass of air within the combustion chamber is not combusted;

a second compression stroke, during which the mass of air within the combustion chamber is recompressed;

a power stroke, during which an air-fuel mixture including the mass of air and a mass of fuel within the combustion chamber is ignited; and an exhaust stroke, immediately subsequent to the power stroke, during which an exhaust valve of the engine cylinder is opened to allow exhaust to exit the engine cylinder.

2. The method of claim 1, wherein, during the intake stroke, fuel is not injected into the combustion chamber.

3. The method of claim 1, wherein, during the decompression stroke, fuel is not ignited within the combustion chamber.

4. The method of claim 1, wherein the second compression stroke includes forgoing opening the exhaust valve.

5. The method of claim 4, wherein forgoing opening the exhaust valve includes deactivating the exhaust valve.

6. The method of claim 1, wherein a mass of fuel is injected into the combustion chamber during or immediately preceding the power stroke.

7. The method of claim 1, wherein the second compression stroke is immediately subsequent to the decompression stroke and wherein the power stroke is immediately subsequent to the second compression stroke.

8. The method of claim 1, wherein the extra-stroke mode includes a plurality of decompression strokes and wherein each of the plurality of decompression strokes is immediately followed by a compression stroke.

9. The method of claim 1, further comprising transitioning operation of the engine from a four-stroke mode to the extra-stroke mode or from the extra-stroke mode to the four-stroke mode in response to one or more engine conditions.

10. The method of claim 1, further comprising transitioning operation of the engine from the extra-stroke mode to a four-stroke mode or from the four-stroke mode to the extra-stroke mode in response to one or more aftertreatment system conditions.

11. A controller configured for operating an engine in an extra-stroke mode, the controller comprising:

a processor; and a memory storing instructions that, when executed by the processor, cause the controller to generate commands for operations including:

transitioning operation of the engine from a four-stroke mode to the extra-stroke mode or from the extra-stroke mode to the four-stroke mode, wherein the four-stroke mode includes an intake stroke, a compression stroke, a power stroke, and an exhaust stroke, and wherein the extra-stroke mode includes at least six strokes of a piston disposed within a combustion chamber of an engine cylinder of the engine, during which an exhaust valve of the engine cylinder is opened only once during the at least six strokes, during or immediately preceding a final upward stroke of the at least six strokes, and during which an intake valve of the engine cylinder is opened only once during the at least six strokes, during or immediately preceding an initial downward stroke.

12. The controller of claim 11, wherein the operations further include:

transitioning operation of the engine from the four-stroke mode to the extra-stroke mode in response to detecting that an engine load of the engine is below a threshold engine load; or transitioning operation of the engine from the extra-stroke mode to the four-stroke mode in response to detecting that the engine load of the engine is above the threshold engine load.

13. The controller of claim 11, wherein the extra-stroke mode further includes forgoing opening the exhaust valve of the engine cylinder at least once.

14. The controller of claim 13, wherein forgoing opening the exhaust valve includes deactivating the exhaust valve.

15. The controller of claim 11, wherein the extra-stroke mode further includes forgoing injecting fuel into the combustion chamber at least once, and wherein a mass of fuel is injected into the combustion chamber only once, during or immediately preceding a final downward stroke of the at least six strokes.

16. An engine system, comprising:

an engine cylinder;

a piston disposed within a combustion chamber of the engine cylinder;

a fuel injector configured to inject fuel for combustion in the engine cylinder; and a controller operative to generate commands that cause the engine system to:

during a first downward stroke of the piston, open an intake valve of the engine cylinder to allow a mass of air to enter the combustion chamber;

during a first upward stroke of the piston immediately subsequent to the first downward stroke, compress the mass of air within the combustion chamber;

during a second downward stroke of the piston immediately subsequent to the first upward stroke, decompress the mass of air within the combustion chamber before fuel is injected into the combustion chamber;

during a second upward stroke of the piston immediately subsequent to the second downward stroke, recompress the mass of air within the combustion chamber without opening an exhaust valve of the engine cylinder;

during, or immediately preceding, a subsequent downward stroke of the piston, inject a mass of fuel into the combustion chamber to form an air-fuel mixture within the combustion chamber and ignite the air-fuel mixture within the combustion chamber; and during a subsequent upward stroke of the piston immediately subsequent to the subsequent downward stroke of the piston, open the exhaust valve of the engine cylinder to allow exhaust to exit the engine cylinder.

17. The engine system of claim 16, wherein the subsequent downward stroke of the piston is subsequent to at least one downward stroke of the piston subsequent to the second upward stroke of the piston.

18. The engine system of claim 16, wherein the controller is further operative to generate commands to cause the engine system to transition operation of the engine system from a four-stroke mode to the extra-stroke mode and from the extra-stroke mode to the four-stroke mode.

19. The engine system of claim 18, wherein the controller is further operative to generate commands that cause the engine system to transition operation of the engine from the four-stroke mode to the extra-stroke mode in response to detecting that an engine load of the engine system is below a threshold engine load, or transition operation of the engine from the extra-stroke mode to the four-stroke mode in response to detecting that the engine load of the engine system is above the threshold engine load.

20. The engine system of claim 16, wherein the controller is further operative to generate commands that cause the engine system to forgo opening the exhaust valve during the second upward stroke of the piston by deactivating the exhaust valve.

* * * * *